US011938881B2

(12) United States Patent
Kwon

(10) Patent No.: US 11,938,881 B2
(45) Date of Patent: Mar. 26, 2024

(54) AIRBAG CUSHION AND DRIVER AIRBAG

(71) Applicant: HYUNDAI MOBIS CO., LTD., Seoul (KR)

(72) Inventor: Oh Koang Kwon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/059,378

(22) Filed: Nov. 28, 2022

(65) Prior Publication Data

US 2023/0356683 A1    Nov. 9, 2023

(30) Foreign Application Priority Data

May 9, 2022    (KR) .................. 10-2022-0056615

(51) Int. Cl.
| | |
|---|---|
| B60R 21/203 | (2006.01) |
| B60R 21/231 | (2011.01) |
| B60R 21/233 | (2006.01) |
| B60R 21/2346 | (2011.01) |
| B60R 21/239 | (2006.01) |
| B60R 21/276 | (2006.01) |

(52) U.S. Cl.
CPC .......... *B60R 21/203* (2013.01); *B60R 21/231* (2013.01); *B60R 21/233* (2013.01); *B60R 21/2346* (2013.01); *B60R 21/239* (2013.01); *B60R 21/276* (2013.01); *B60R 2021/23308* (2013.01); *B60R 2021/23324* (2013.01)

(58) Field of Classification Search
CPC ... B60R 21/203; B60R 21/233; B60R 21/276; B60R 21/231; B60R 21/239; B60R 21/2346; B60R 2021/23308; B60R 2021/23324

USPC .............................. 280/729, 731, 739, 743.1
See application file for complete search history.

(56) References Cited

U.S. PATENT DOCUMENTS

| | | | | |
|---|---|---|---|---|
| 5,240,283 | A | * | 8/1993 | Kishi .................... B60R 21/233 |
| | | | | 280/743.1 |
| 5,529,337 | A | * | 6/1996 | Takeda .................. B60R 21/233 |
| | | | | 280/729 |
| 11,220,230 | B1 | | 1/2022 | Faruque et al. |
| 2001/0028162 | A1 | * | 10/2001 | Takimoto ............... B60R 21/237 |
| | | | | 280/728.2 |
| 2011/0148083 | A1 | * | 6/2011 | Paxton ................ B60R 21/2346 |
| | | | | 280/736 |

FOREIGN PATENT DOCUMENTS

JP    2021-054249    4/2021

OTHER PUBLICATIONS

English Language Abstract of JP 2021-054249 published Apr. 8, 2021.

* cited by examiner

*Primary Examiner* — Keith J Frisby
(74) *Attorney, Agent, or Firm* — DLA Piper LLP (US)

(57) ABSTRACT

An airbag cushion is configured to increase a deployment supporting force thereof to prevent a risk of passenger injury, and includes a main chamber configured to be deployed from a steering wheel toward a passenger, and an air frame chamber configured to protrude and be deployed behind the main chamber into a rib shape and to support the main chamber.

11 Claims, 4 Drawing Sheets

AIRBAG CUSHION AND DRIVER AIRBAG

CROSS REFERENCE TO RELATED APPLICATION

The present application claims priority to Korean Patent Application No. 10-2022-0056615, filed May 9, 2022, the entire contents of which is incorporated herein for all purposes by this reference.

BACKGROUND OF THE INVENTION

Field of the Invention

The present invention relates generally to an airbag cushion configured to improve a deployment supporting force of an airbag cushion to prevent a risk of passenger injury.

Description of the Related Art

In the event of a vehicle accident, an airbag cushions an impact of a passenger with appropriate expansion of an airbag cushion to reduce or prevent injuries to the passenger, and expansion movement of the airbag cushion is important in ensuring safety of the passenger.

Meanwhile, a circular shape is mostly applied as a shape of a conventional steering wheel, and when a driver seat airbag is deployed, a rim portion formed in an upper portion of the circular steering wheel supports the airbag cushion, thus helping maintenance of the shape of the airbag cushion.

However, in a steering wheel of which a rim thereof is partially removed, such as a yoke steering wheel, when the airbag is deployed, the rim portion supporting the airbag cushion does not exist partially, so that a supporting force of the airbag cushion at the portion without the rim is insufficient, and thus there is a problem that unexpected passenger injuries occur when the passenger is cushioned on the airbag cushion.

SUMMARY OF THE INVENTION

The present invention has been made keeping in mind the above problems occurring in the related art, and the present invention is intended to propose an airbag cushion configured to improve a deployment supporting force of an airbag cushion of a driver seat to prevent a risk of passenger injury.

In order to achieve the above objective, according to one aspect of the present invention, there is provided an airbag cushion including: a main chamber configured to be deployed from a steering wheel toward a passenger; and an air frame chamber configured to protrude and be deployed behind the main chamber into a rib shape and to support the main chamber.

The air frame chamber may be extended from a center portion of the main chamber to a rim of the main chamber.

The air frame chamber may be formed radially on a center portion of the main chamber.

The air frame chamber may be configured to be deployed prior to the main chamber.

The air frame chamber may be configured to receive gas discharged from an inflator, and to allow the gas therein to flow into the main chamber.

The air frame chamber and the main chamber may be divided from each other by a partition film, and the partition film may have a ventilation means so that the gas may penetrate through the partition film.

The partition film may be formed of a breathable fabric so that the gas may penetrate through the partition film.

The partition film may have an inner vent hole so that the gas may penetrate through the partition film.

Gas discharged from an inflator may be configured to flow directly into the entire air frame chamber.

A dead zone into which gas may be not filled may be provided within the air frame chamber, and an outer vent hole may be formed in the dead zone and communicate with the main chamber.

A front panel and a rear panel may be connected to each other by a breathable partition film located therebetween, the main chamber and the air frame chamber may be respectively formed on opposite portions of the partition film, and the dead zone may be formed as the rear panel and the partition film are in close contact with each other.

A driver seat airbag may include: an airbag cushion including a main chamber and an air frame chamber, the main chamber being configured to be deployed from a steering wheel toward a passenger and the air frame chamber being configured to protrude and be deployed into a rib shape behind the main chamber and to support the main chamber.

A driver seat airbag may include: a breathable partition film dividing an inside space of an airbag cushion; a main chamber configured to be deployed from a first portion of the partition film and to support a driver; and an air frame chamber configured to be deployed from a side portion of the partition film into a rib shape and to support the main chamber.

As described above, according to the present invention, the air frame chambers are formed into the frame structure at the rear portion of the airbag cushion, so that the structure imparts rigidity to the air frame chamber, thus supporting the airbag cushion stably.

Therefore, even in the case of the steering wheel of which a part of a rim or a whole rim is omitted, the collision protection function of the airbag is maintained, so that the driver cushioned on the main chamber can be safely protected.

DETAILED DESCRIPTION OF THE INVENTION

Figure 1:
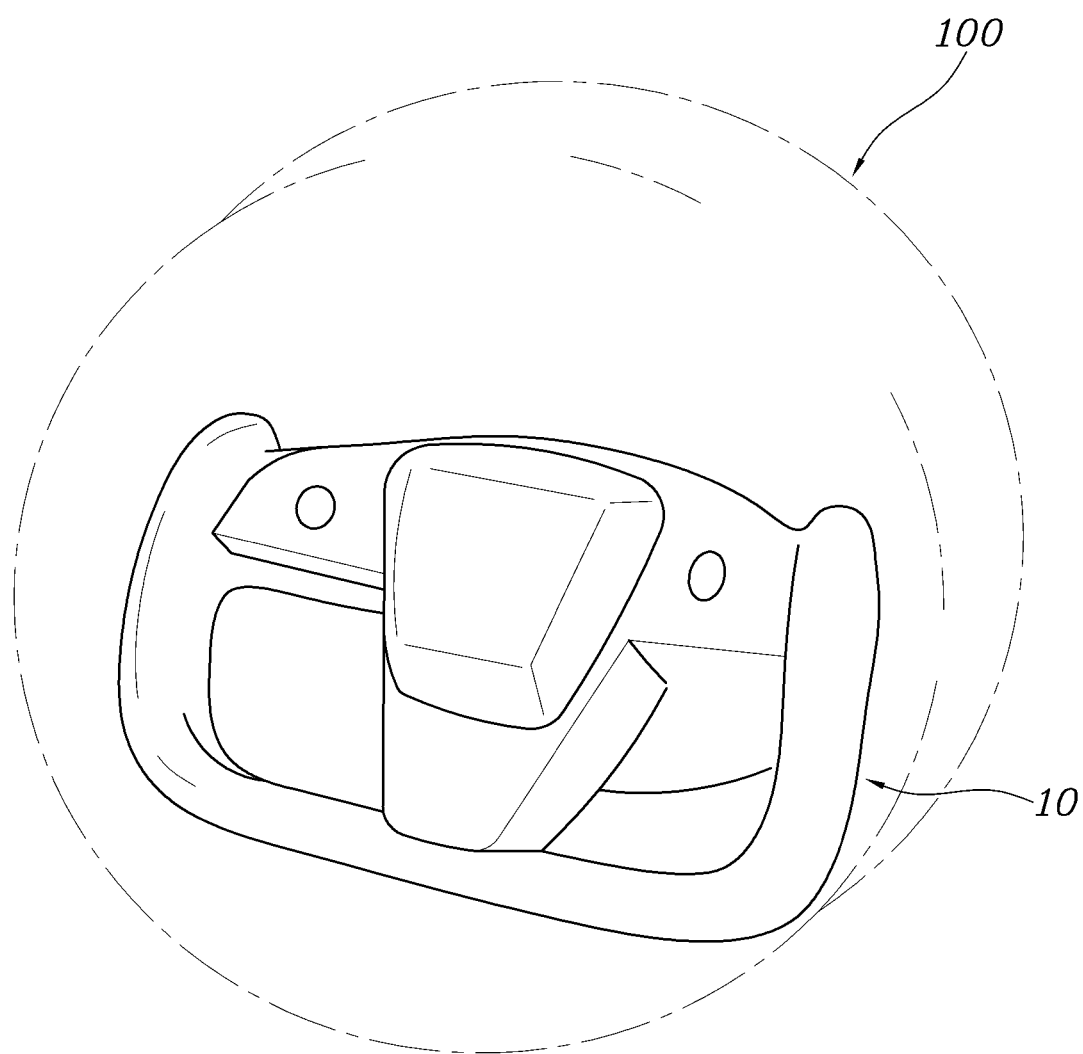
FIG. 1 is a view showing an airbag cushion of the present invention deployed from a yoke steering wheel.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, exemplary embodiments of the present invention will be described in detail with reference to accompanying drawings.

FIG. 1 is a view showing an airbag cushion 100 of the present invention deployed from a yoke steering wheel.

Referring to FIG. 1, the airbag cushion 100 according to the present invention is applied to a driver seat airbag, and is mounted to the inside portion of a steering wheel 10.

When a collision signal of a vehicle is input, an inflator 200 explodes and supplies gas into the airbag cushion 100, so that the airbag cushion 100 expands and is deployed toward a driver into a shape of covering a front surface of the steering wheel 10. Therefore, the driver's body is restrained by the airbag cushion 100, thereby protecting the driver from a shock of a collision accident.

Figure 2:
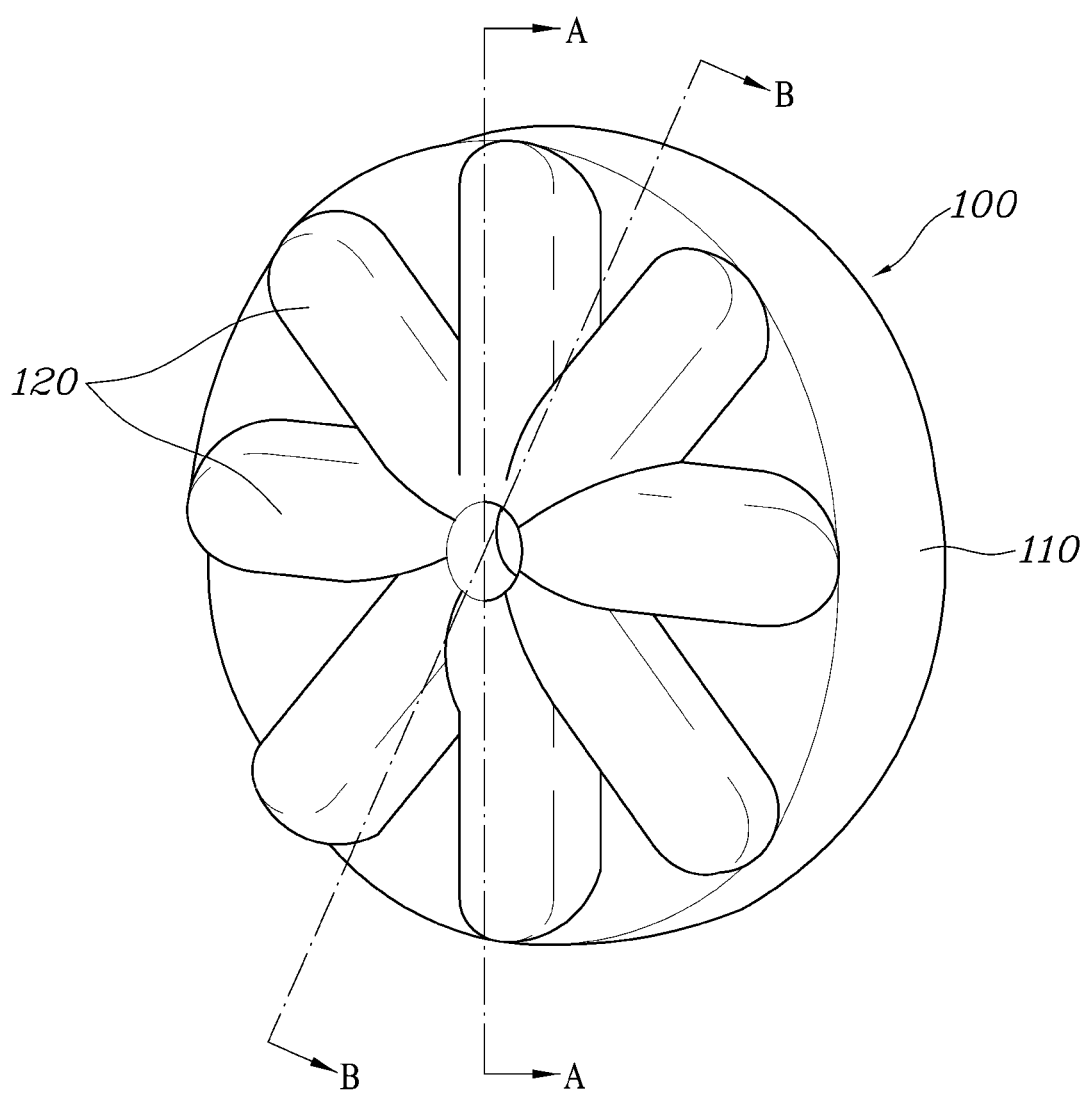
FIG. 2 is a view showing the airbag cushion according to the present invention at a viewpoint from an air frame chamber.

Meanwhile, FIG. 2 is a view showing the airbag cushion 100 according to the present invention at a viewpoint from an air frame chamber 120.

Referring to FIG. 2, the airbag cushion 100 of the present invention includes: a main chamber 110 deployed from the steering wheel 10 toward a passenger; and the air frame chamber 120 protruding and deployed behind the main chamber 110 with a rib shape and supporting the main chamber 110.

For example, a disc type front panel 100a and a disc type rear panel 100b are provided, and a rim of the front panel 100a and a rim of the rear panel 100b are sewn with each other to form the airbag cushion 100.

Then, as the gas is injected into the airbag cushion 100, the airbag cushion 100 is deployed into a disc shape.

In addition, as the main chamber 110 is provided at the front panel 100a and is deployed toward the passenger, the driver's body is cushioned thereon, and the air frame chamber 120 is provided at the rear panel 100b and is deployed while covering the front surface of the steering wheel 10.

Specifically, the air frame chamber 120 is deployed between the main chamber 110 and the steering wheel 10, and the air frame chamber 120 is formed into a frame structure at a rear surface of the main chamber 110, so that rigidity is given to the air frame chamber 120 thereby supporting the main chamber 110.

Therefore, even when a part of a rim or the entire rim is removed from the steering wheel 10, as the main chamber 110 is stably supported by the air frame chamber 120 given the supporting rigidity, a collision protection function of the airbag is maintained and thus the driver to be cushioned on the main chamber 110 can be safely protected.

In addition, according to the present invention, the air frame chamber 120 is formed to be extended from a center portion of the main chamber 110 to a rim of the main chamber 110.

Preferably, as shown in FIG. 2, the air frame chamber 120 may be formed radially on the center portion of the main chamber 110.

In other words, the air frame chamber 120 is extended to the rim of the airbag cushion 100 at a rear portion of the airbag cushion 100 into a linear shape, and the air frame chamber 120 is provided at the rear portion of the airbag cushion 100 into a spoke shape formed uniformly with equal angles, thereby improving the supporting rigidity of the airbag cushion 100.

Figure 3:
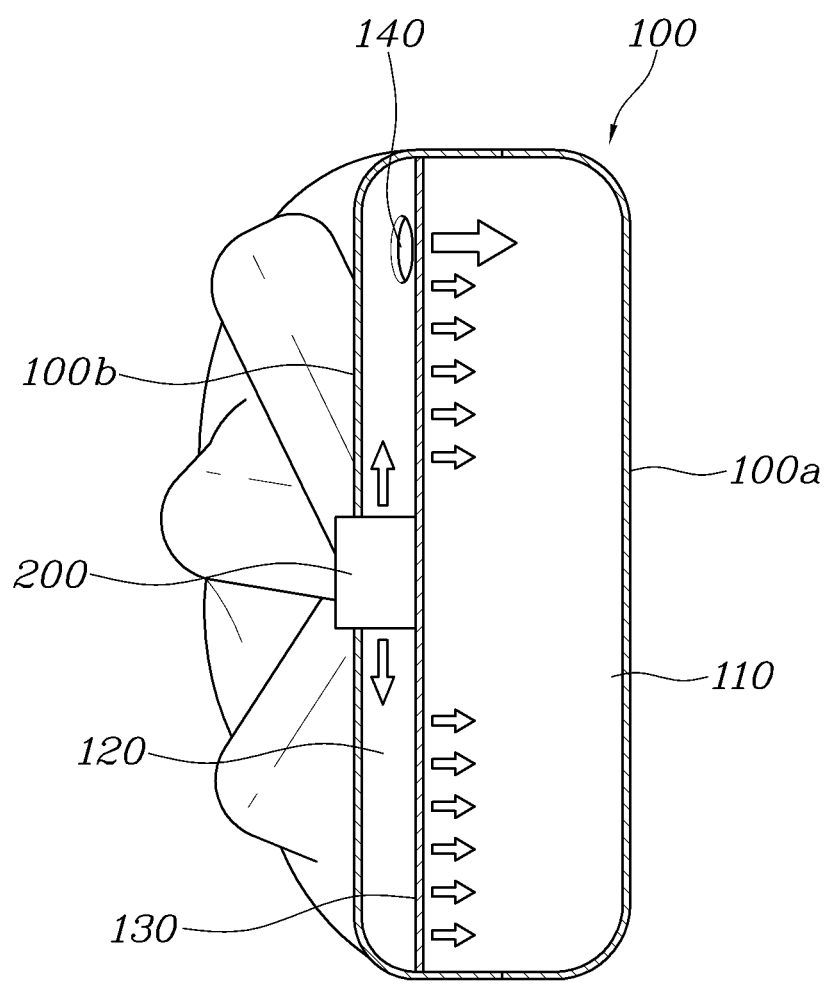
FIG. 3 is a sectional view taken along line A-A in FIG. 2.
Figure 4:
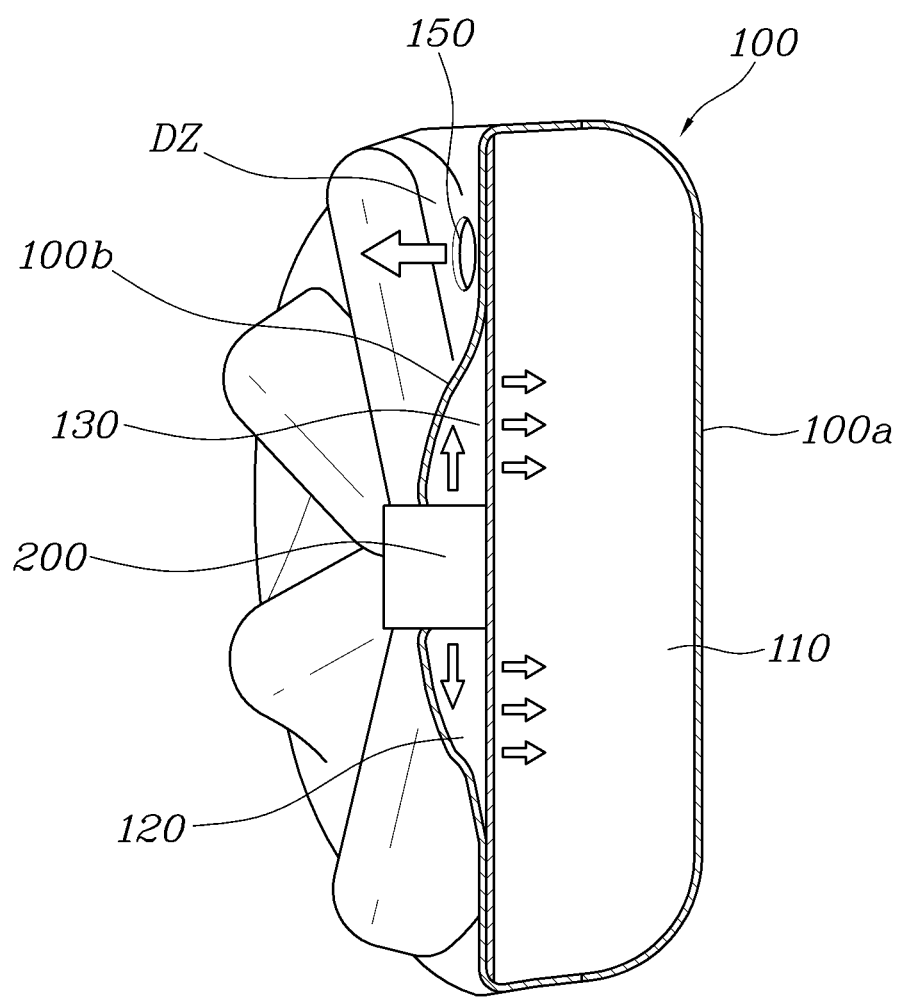
FIG. 4 is a sectional view taken along line B-B in FIG. 2.

Meanwhile, FIG. 3 is a sectional view taken along line A-A in FIG. 2. FIG. 4 is a sectional view taken along line B-B in FIG. 2.

Referring to FIGS. 3 and 4, the air frame chamber 120 may be deployed prior to the main chamber 110.

In other words, the air frame chamber 120 is deployed prior to the main chamber 110, and the air frame chamber 120 deployed in advance stably supports the main chamber 110.

As described above, in order to deploy the air frame chamber 120 with priority, the present invention may be configured such that the gas discharged from the inflator 200 flows into the air frame chamber 120 and the gas inside the air frame chamber 120 flows into the main chamber 110.

To this end, an outlet of the inflator 200 communicates with the inside space of the air frame chamber 120, and the air frame chamber 120 communicates with the main chamber 110.

In addition, as shown in FIG. 3, in order to supply the gas inside the air frame chamber 120 into the main chamber 110, the present invention is configured such that the air frame chamber 120 and the main chamber 110 are divided from each other by a partition film 130, and a ventilation means is provided in the partition film 130 and allows the gas to penetrate through the partition film.

For example, as the disc-type partition film 130 having a breathable function is connected to a portion where the front panel 100a and the rear panel 100b are connected to each other, the main chamber 110 is formed at the driver's side of the partition film 130, and the air frame chamber 120 is formed at the steering wheel's side of the partition film 130.

Then, as an example of the ventilation means, the partition film 130 is made of the breathable fabric so that the gas penetrates through the partition film 130.

In other words, the front panel 100a and the rear panel 100b are formed of a coated fabric to prevent ventilation from occurring therethrough, but the partition film 130 is formed of the breathable fabric that is not coated, so that the gas flowing into the air frame chamber 120 penetrates through the partition film 130 of the breathable fabric and is filled into the main chamber 110.

Then, the partition film 130 serves to support the inside space of the main chamber 110 by a pressure of the gas filled into the air frame chamber 120, so that the main chamber 110 is stably supported.

As another embodiment of the ventilation means, the partition film 130 has an inner vent hole 140 so as to allow the gas to penetrate through the partition film.

Specifically, the inner vent hole 140 may include at least one inner vent hole 140, and the inner vent hole 140 is formed in the partition film 130 located between the space of the air frame chamber 120 and the space of the main chamber 110.

Therefore, the gas flowing into the air frame chamber 120 can be supplied into the main chamber 110 and the airbag cushion 100 can be quickly deployed.

For example, the inner vent hole 140 may be selectively applied to the partition film 130.

Moreover, as shown in FIG. 4, the gas discharged from the inflator 200 may flow directly into the entire air frame chamber 120.

For example, in the structure in which the air frame chamber 120 is formed radially, the inflator 200 is installed at a center portion of the rear surface of the airbag frame chamber, and the outlet of the inflator 200 communicates with the space between the rear panel 100b and the partition film 130, i.e., with the air frame chamber 120.

Then, a space is formed between air frame chambers 120 that are located adjacent to each other at one end of each air frame chamber 120 connected to a center portion of a rear surface of the airbag cushion 100, so that the gas discharged from the inflator 200 is separately introduced into each of the air frame chambers 120.

Therefore, when all the air frame chambers 120 are deployed evenly and the airbag cushion 100 is deployed, the airbag cushion 100 is quickly unfolded without leaning to either side.

Meanwhile, referring to FIG. 4, a dead zone DZ into which the gas is not filled is formed between the air frame chambers 120, and an outer vent hole 150 may be formed in the dead zone DZ and communicates with the main chamber 110.

In other words, the dead zone DZ is formed at the predetermined air frame chambers 120 at the rear portion of the airbag cushion 100, and at least the one outer vent hole 150 is formed in the dead zone DZ, and after the driver is cushioned on the main chamber 110, the gas filled inside the airbag cushion 100 is discharged so as to stably restrain the driver.

In addition, describing the structure of the airbag cushion 100 forming the dead zone DZ, the breathable partition film 130 is connected to the portion between the front panel 100a and the rear panel 100b, the main chamber 110 and the air frame chamber 120 are respectively formed at the opposite sides of the partition film 130, and the dead zone DZ may be formed as the rear panel 100b and the partition film 130 are in close contact with each other.

In other words, at the rear portion of the airbag cushion 100, the rear panel 100b and the partition film 130 are spaced apart from each other and a portion in which the space is formed serves as the air frame chamber 120, and a portion, in which where the rear panel 100b and the partition film 130 are overlapped with each other and fixed, serves as the dead zone DZ.

Therefore, as the dead zone DZ serves as the rear surface of the main chamber 110, the gas filled inside the main chamber 110 is discharged to the outside space via the outer vent hole 150 formed in the dead zone DZ.

As described above, according to the present invention, the air frame chambers 120 are formed into a frame structure at the rear portion of the airbag cushion 100, so that the structure imparts rigidity to the air frame chamber 120, thus stably supporting the airbag cushion 100.

Therefore, even in the case of the steering wheel 10 of which a part of a rim or a whole rim is omitted, the collision protection function of the airbag is maintained so that the driver cushioned on the main chamber 110 can be safely protected.

Although the preferred embodiments of the present invention have been disclosed for illustrative purposes, those skilled in the art will appreciate that various modifications, additions, and substitutions are possible, without departing from the spirit and scope of the present invention.

What is claimed is:

1. An airbag cushion comprising:
    a main chamber configured to be deployed from a steering wheel; and
    a plurality of air frame chambers configured to protrude radially from a center portion of the main chamber, each air frame chamber having a rib shape, and wherein, when the plurality of air frame chambers are deployed, the plurality of air frame chambers are deployed behind the main chamber to support the main chamber;
    wherein a dead zone into which gas is not filled is provided around each air frame chamber, and an outer vent hole is formed in the dead zone and communicates with the main chamber, and
    wherein a front panel and a rear panel are connected to each other by a breathable partition film located therebetween, the main chamber and each air frame chamber are respectively formed on opposite portions of the partition film, the dead zone is formed when the rear panel and the partition film are in close contact with each other.

2. The airbag cushion of claim 1, wherein each air frame chamber is extended from a center portion of the main chamber to a rim of the main chamber.

3. The airbag cushion of claim 1, wherein each air frame chamber is formed radially on a center portion of the main chamber.

4. The airbag cushion of claim 1, wherein each air frame chamber is configured to be deployed prior to the main chamber.

5. The airbag cushion of claim 1, wherein each air frame chamber is configured to receive gas discharged from an inflator, and to allow the gas therein to flow into the main chamber.

6. The airbag cushion of claim 5, wherein each air frame chamber and the main chamber are divided from each other by a partition film, and the partition film has ventilation means so that the gas penetrates through the partition film.

7. The airbag cushion of claim 6, wherein the partition film is formed of a breathable fabric so that the gas penetrates through the partition film.

8. The airbag cushion of claim 6, wherein the partition film has an inner vent hole so that the gas penetrates through the partition film.

9. The airbag cushion of claim 1, wherein gas discharged from an inflator is configured to flow directly into an entire air frame chamber.

10. A driver seat airbag comprising:
an airbag cushion comprising a main chamber and a plurality of air frame chambers configured to protrude radially from a center portion of the main chamber, each air frame chamber having a rib shape, and wherein, when the airbag cushion is deployed, the main chamber is deployed from a steering wheel and each of the plurality of air frame chambers are deployed behind the main chamber to support the main chamber;
wherein a dead zone into which gas is not filled is provided around each air frame chamber, and an outer vent hole is formed in the dead zone and communicates with the main chamber, and
wherein a front panel and a rear panel are connected to each other by a breathable partition film located therebetween, the main chamber and each air frame chamber are respectively formed on opposite portions of the partition film, the dead zone is formed when the rear panel and the partition film are in close contact with each other.

11. A driver seat airbag comprising:
a breathable partition film dividing an inside space of an airbag cushion;
a main chamber configured to be deployed from a first portion of the partition film and to support a driver; and
a plurality of air frame chambers configured to protrude radially from a center portion of the main chamber to be deployed from a side portion of the partition film, each of the air frame chambers having a rib shape, and wherein when the plurality of air frame chambers are deployed, the plurality of air frame chambers are deployed behind the main chamber to support the main chamber;
wherein a dead zone into which gas is not filled is provided around each air frame chamber, and an outer vent hole is formed in the dead zone and communicates with the main chamber, and
wherein a front panel and a rear panel are connected to each other by the partition film, which is located therebetween, the main chamber and each air frame chamber are respectively formed on opposite portions of the partition film, the dead zone is formed when the rear panel and the partition film are in close contact with each other.

* * * * *